(12) United States Patent
Huang et al.

(10) Patent No.: US 11,572,955 B1
(45) Date of Patent: Feb. 7, 2023

(54) GAS SWITCHING DEVICE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

(*) Notice: Subject to any disclaimer, the term of this patent is extended or adjusted under 35 U.S.C. 154(b) by 0 days.

(21) Appl. No.: 17/519,212

(22) Filed: Nov. 4, 2021

(51) Int. Cl.
*F16K 5/04* (2006.01)
*F16K 31/60* (2006.01)
(Continued)

(52) U.S. Cl.
CPC .......... *F16K 5/0414* (2013.01); *F16K 27/065* (2013.01); *F16K 31/60* (2013.01); *F16L 37/252* (2013.01)

(58) Field of Classification Search
CPC .... F16K 5/0214; F16K 5/0235; F16K 5/0414; F16K 5/0435; F16K 27/065;
(Continued)

(56) References Cited

U.S. PATENT DOCUMENTS

| 498,787 | A | * | 6/1893 | Hagen | F16L 37/252 251/149 |
| 1,240,161 | A | * | 9/1917 | Olds | F16L 37/252 251/345 |

(Continued)

FOREIGN PATENT DOCUMENTS

| CN | 1281120 A | 1/2001 |
| TW | I576544 B | 4/2017 |

(Continued)

OTHER PUBLICATIONS

Search report for TW110130064, dated Apr. 20, 2022, Total of 1 page.

(Continued)

*Primary Examiner* — Craig J Price
(74) *Attorney, Agent, or Firm* — Apex Juris, PLLC; R Wylie; Tracy Heims

(57) ABSTRACT

A gas switching device incudes a valve body, a switching assembly, and a manipulating member. The valve body has an inlet portion having an inlet passage and an outlet portion having an outlet port and a receiving chamber. A wall of the receiving chamber has a side opening communicating with the inlet passage. The switching assembly includes a plug member located in the receiving chamber. The manipulating member is detachably connected to the outlet port via the connecting end connected to the plug member, and a gas passage of the connecting end communicates with an axial hole of the plug member. The manipulating member drives the plug member to turn between a first position that an outer peripheral surface of the plug member closes the side opening and a second position that the through hole communicates with the side opening.

12 Claims, 13 Drawing Sheets

(51) Int. Cl.
*F16K 27/06* (2006.01)
*F16L 37/252* (2006.01)

(58) Field of Classification Search
CPC ......... F16K 27/062; F16L 37/40; F16L 37/42; F16L 37/44; F16L 37/46; F16L 37/47; F16L 37/248; F16L 37/252; F16L 31/528; F16L 31/5284; F16L 31/5286; Y10T 137/87925–87973
USPC .............................. 251/207, 310, 149–149.9
See application file for complete search history.

(56) References Cited

U.S. PATENT DOCUMENTS

| | | | | |
|---|---|---|---|---|
| 1,805,580 | A * | 5/1931 | Hazlett | F16L 37/252 251/149 |
| 1,953,776 | A * | 4/1934 | Roberts | F16K 35/027 251/96 |
| 2,194,714 | A * | 3/1940 | Mueller | F16K 35/027 251/297 |
| 2,205,117 | A * | 6/1940 | Chambers | F25B 5/02 165/223 |
| 2,415,701 | A * | 2/1947 | Midgett | F16L 37/28 137/625.32 |
| 2,665,107 | A * | 1/1954 | Blackford | F16K 5/10 251/96 |
| 2,795,438 | A * | 6/1957 | Oetiker | F16L 37/40 285/376 |
| 3,292,660 | A * | 12/1966 | Zarybnicky | F16K 5/0214 137/601.19 |
| 3,712,580 | A * | 1/1973 | Shopsky | F16K 35/027 251/96 |
| 4,029,291 | A * | 6/1977 | Carlson | F16K 35/027 251/96 |
| 4,862,917 | A * | 9/1989 | Genbauffe | F16K 5/10 137/601.19 |
| 5,826,854 | A * | 10/1998 | Janvrin | F16L 55/24 210/234 |
| 6,520,481 | B2 * | 2/2003 | Harneit | F23N 1/007 251/207 |
| 6,863,257 | B2 * | 3/2005 | Home | F16K 5/0214 251/310 |
| 7,156,370 | B2 * | 1/2007 | Albizuri | F23N 3/02 251/207 |
| 10,267,513 | B2 * | 4/2019 | Huang | F23C 1/08 |
| 10,871,235 | B1 * | 12/2020 | Huang | F16K 31/041 |
| 2009/0223576 | A1 * | 9/2009 | Seppmann | F16L 37/40 137/540 |

FOREIGN PATENT DOCUMENTS

| | | |
|---|---|---|
| TW | I623710 B | 5/2018 |
| WO | 2014058716 A1 | 4/2014 |

OTHER PUBLICATIONS

English abstract for corresponding document: JP2001027337, Total of 1 page.
English abstract for TWI576544, Total of 1 page.
English abstract for CN1281120, Total of 1 page.
Unpublished U.S. Appl. No. 17/495,466, filed Oct. 6, 2021.

* cited by examiner

GAS SWITCHING DEVICE

BACKGROUND OF THE INVENTION

Technical Field

The present invention relates generally to a gas switch, and more particularly to a gas switching device that could remove a gas pipe.

Description of Related Art

Typically, a gas switch is disposed on a gas pipeline connected to the gas appliance for opening/blocking the gas supplied to the gas appliance. To increase a safety of using the gas, the gas switch should be turned off to avoid gas leakage and causing disasters when sleeping at night, going out, or not using gas for a short period time.

A conventional gas switch has an inlet connector and an outlet connector, wherein the inlet connector is usually locked on a gas pipeline to communicate with a gas source. The outlet connector is fixed to a gas hose and is connected to the gas appliance via the gas hose. Turn a handle of a gas switch device to drive a ball valve inside the gas switch device to open or close the gas supplied to the gas appliance.

Usually, the gas hose is fastened to the outlet connector by a tube bundle. When a user is about to remove the gas hose, the handle should be turned first to close the gas, and then release the tube bundle to remove the gas hose from the outlet connector, which is inconvenient. Additionally, after removing the gas hose, it may cause the gas to leak from the outlet connector if the handle is accidentally touched, which is dangerous.

Therefore, the conventional gas switch device still has room for improvement.

BRIEF SUMMARY OF THE INVENTION

In view of the above, the primary objective of the present invention is to provide a gas switching device, which could easily use the gas and enhance a safety of use.

The present invention provides a gas switching device, including a valve body, a switching assembly, and a manipulating member, wherein the valve body has an inlet portion and an outlet portion. The inlet portion has an inlet passage for injecting gas. The outlet portion has an outlet port and a receiving chamber. A wall of the receiving chamber has a side opening communicating with the inlet passage. The switching assembly includes a a plug member located in the receiving chamber, wherein the plug member has a through hole located at a radial direction of the plug member and an axial hole communicating with the through hole and the outlet port. The plug member is turnable between a first position and a second position in an axial direction of the plug member. When the plug member is at the first position, an outer peripheral surface of the plug member closes the side opening. When the plug member is at the second position, the through hole communicates with the side opening. The manipulating member has a connecting end and has a gas passage therein, wherein an end of the gas passage forms an inlet at the connecting end, and another end of the gas passage is adapted to communicate with a gas pipe. The manipulating member is detachably connected to the outlet port via the connecting end; the connecting end is connected to the plug member, and the gas passage communicates with the axial hole. The manipulating member drives the plug member to turn between the first position and the second position.

With the aforementioned design, the plug member could be turned by the manipulating member, and the gas could be transmitted to the gas pipe via the gas passage inside the manipulating member, which is more convenient to use the gas, wherein after use, the manipulating member could be removed together with the gas pipe. In addition, since the plug member is inside the valve body, the plug member would not be touched by mistake to lead to a problem that the output gas leaks from the outlet port, enhancing a safety of use.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
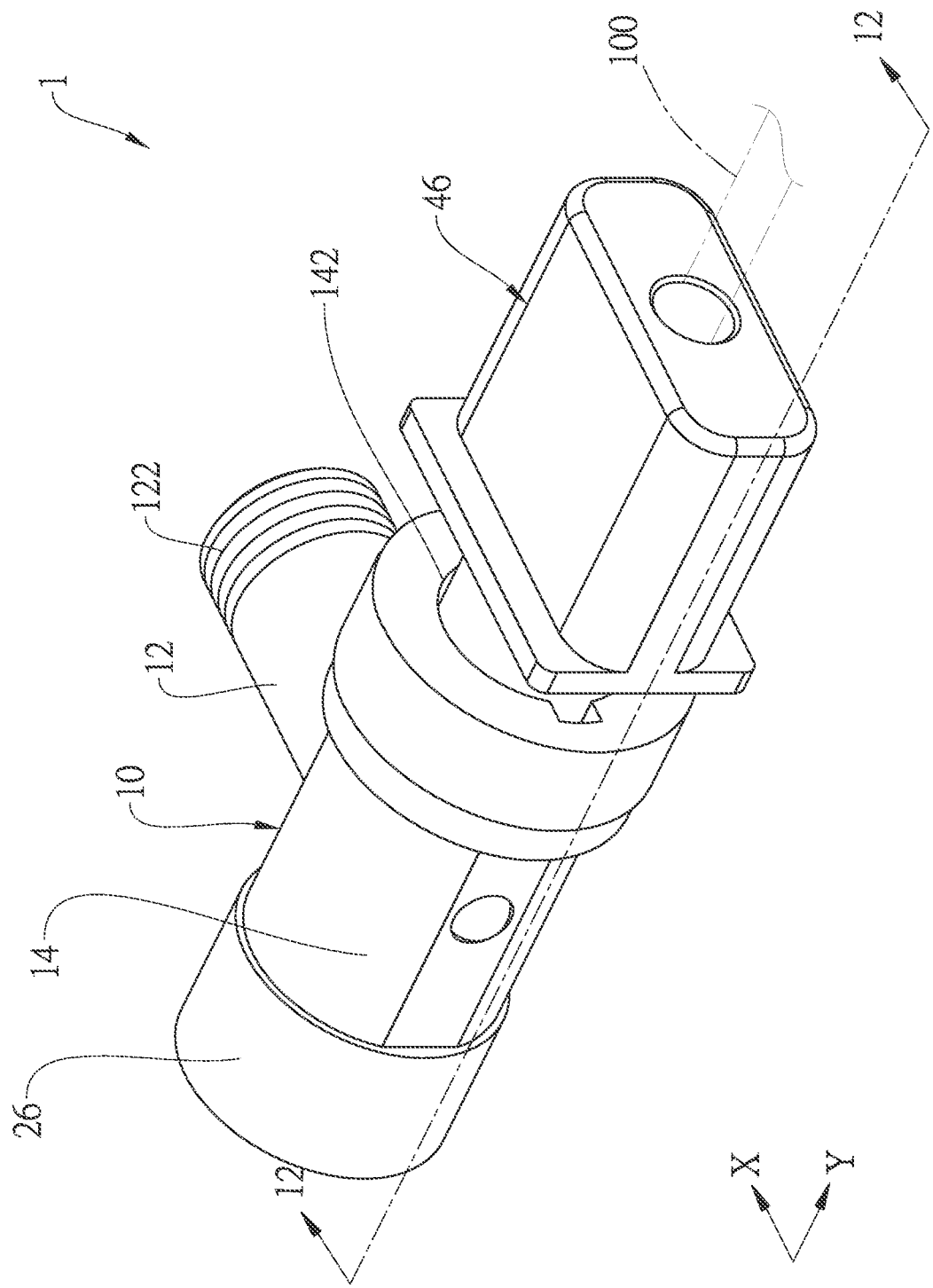
FIG. 1 is a perspective view of the gas switching device according to an embodiment of the present invention.
Figure 2:
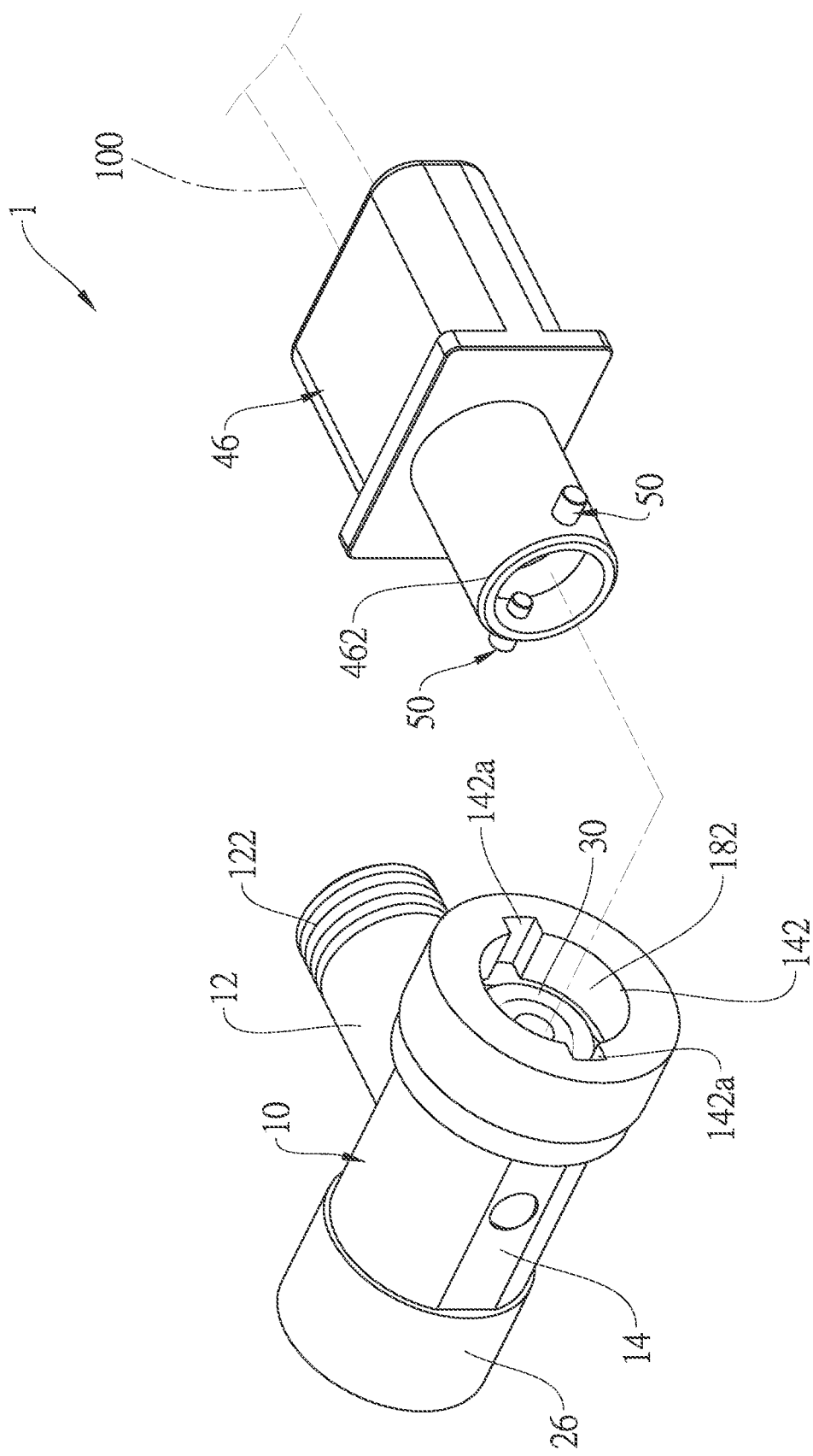
FIG. 2 is an exploded perspective view of the gas switching device according to the embodiment of the present invention.
Figure 3:
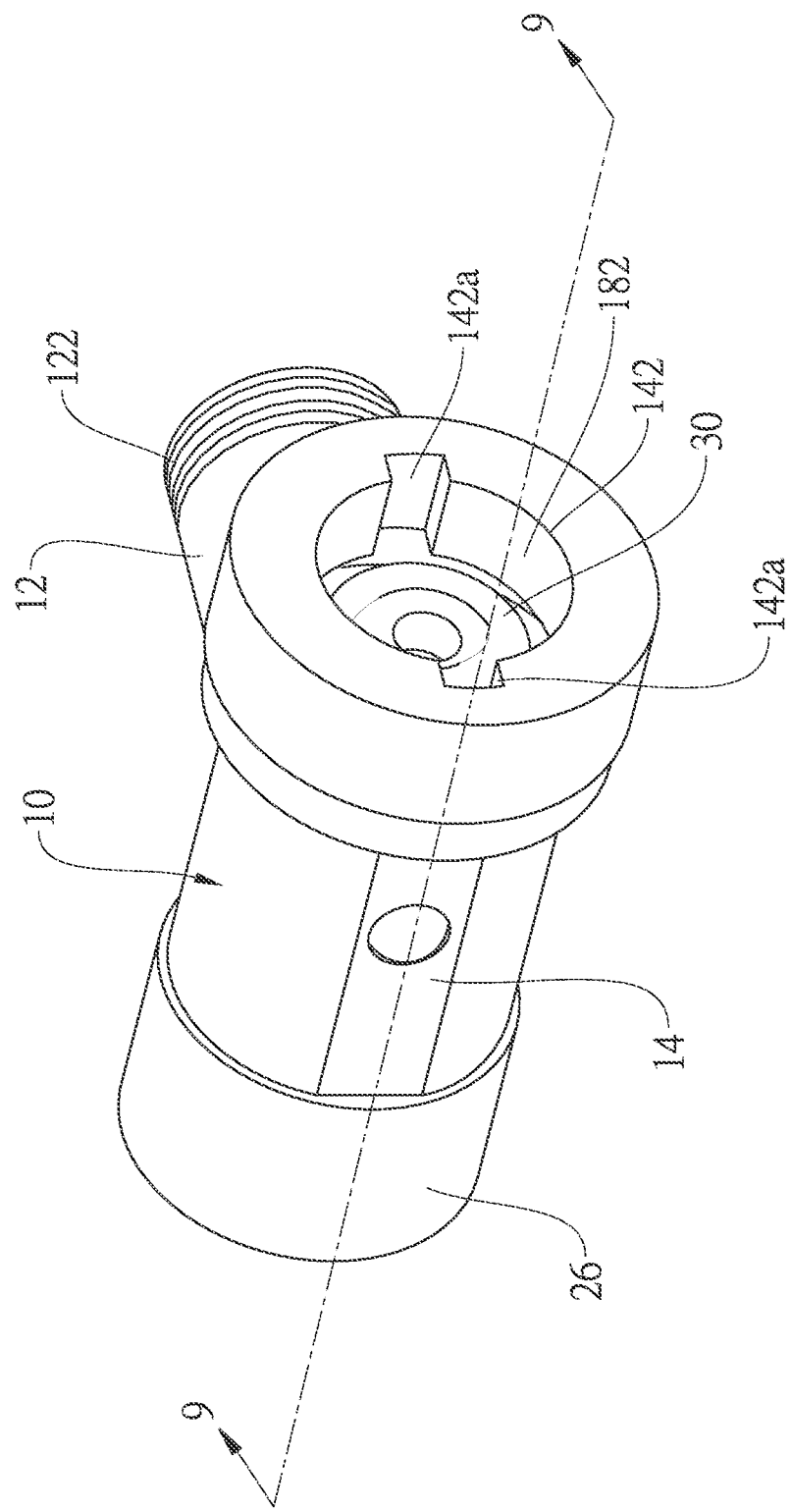
FIG. 3 is a perspective view of the valve body and the switching assembly according to the embodiment of the present invention.
Figure 4:
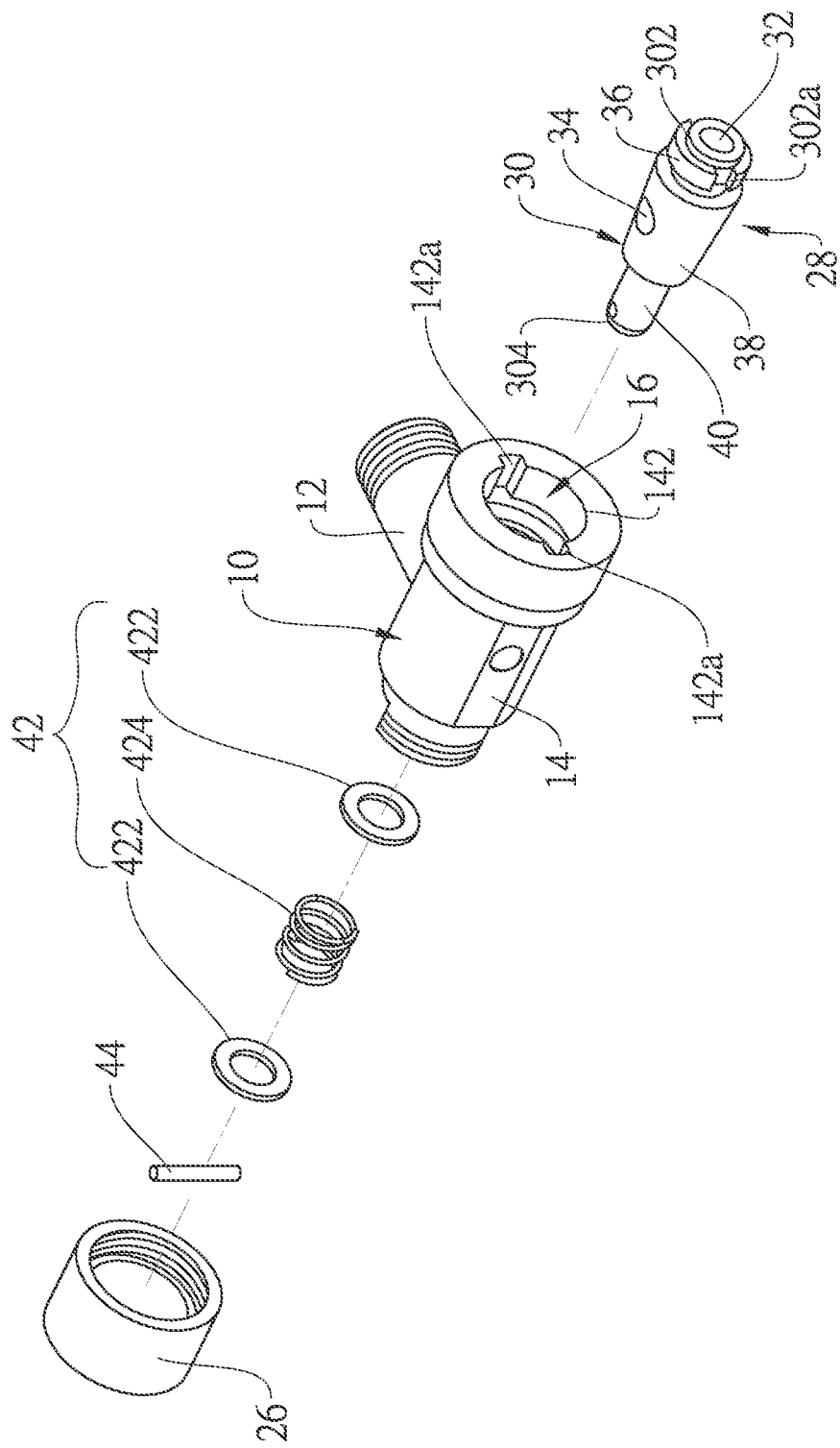
FIG. 4 is an exploded perspective view, showing the valve body and the switching assembly according to the embodiment of the present invention.

A gas switching device 1 according to an embodiment of the present invention is illustrated in FIG. 1 to FIG. 13 and includes a valve body 10, a switching assembly 28, and a manipulating member 46.

The valve body 10 has an inlet portion 12 and an outlet portion 14, wherein the inlet portion 12 is tubular and has an external threaded section 122 for engaging with a gas supplying tube (not shown). The inlet portion 12 has an inlet passage 124 for injecting gas and extends in a first axial direction X.

The outlet portion 14 is tubular and is connected to the inlet portion 12, wherein the outlet portion 14 extends in a second axial direction Y which intersects the first axial direction X. In the current embodiment, the second axial direction Y is substantially perpendicular to the first axial direction X. The outlet portion 14 has an outlet port 142 for connecting the manipulating member 46.

Figure 8:
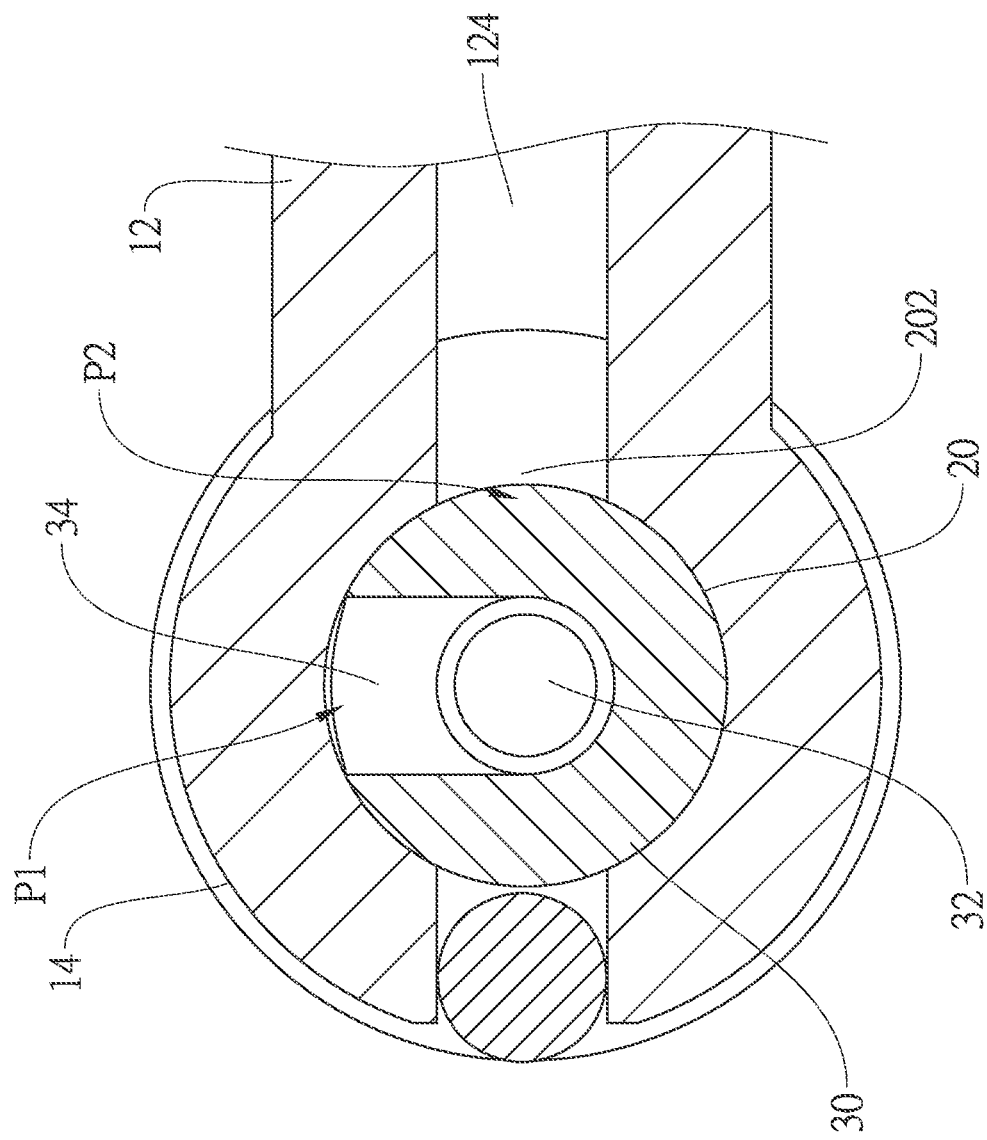
FIG. 8 is a sectional view along the 7-7 line in FIG. 7.
Figure 9:
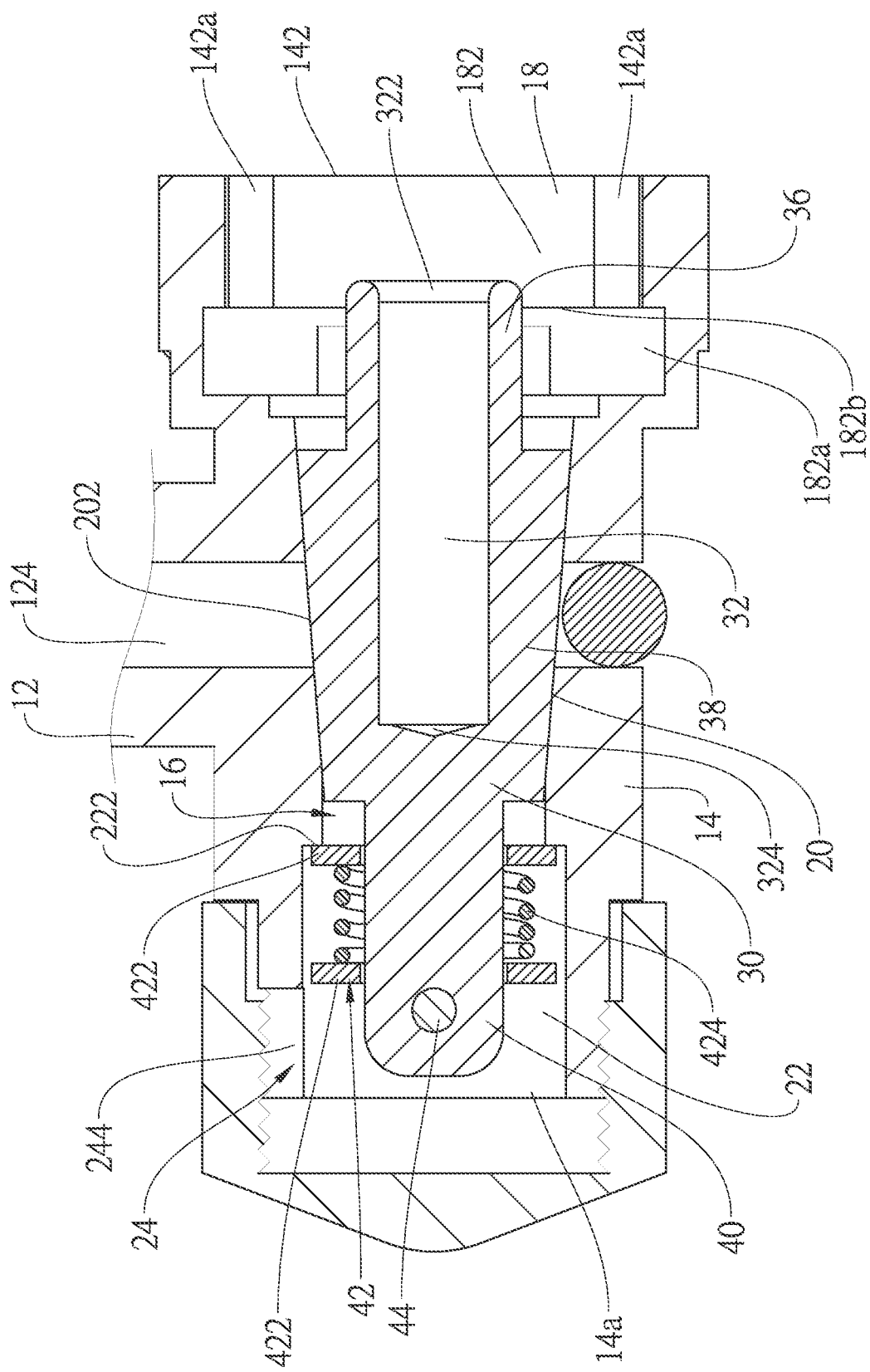
FIG. 9 is a sectional view along the 9-9 line in FIG. 3.
Figure 10:
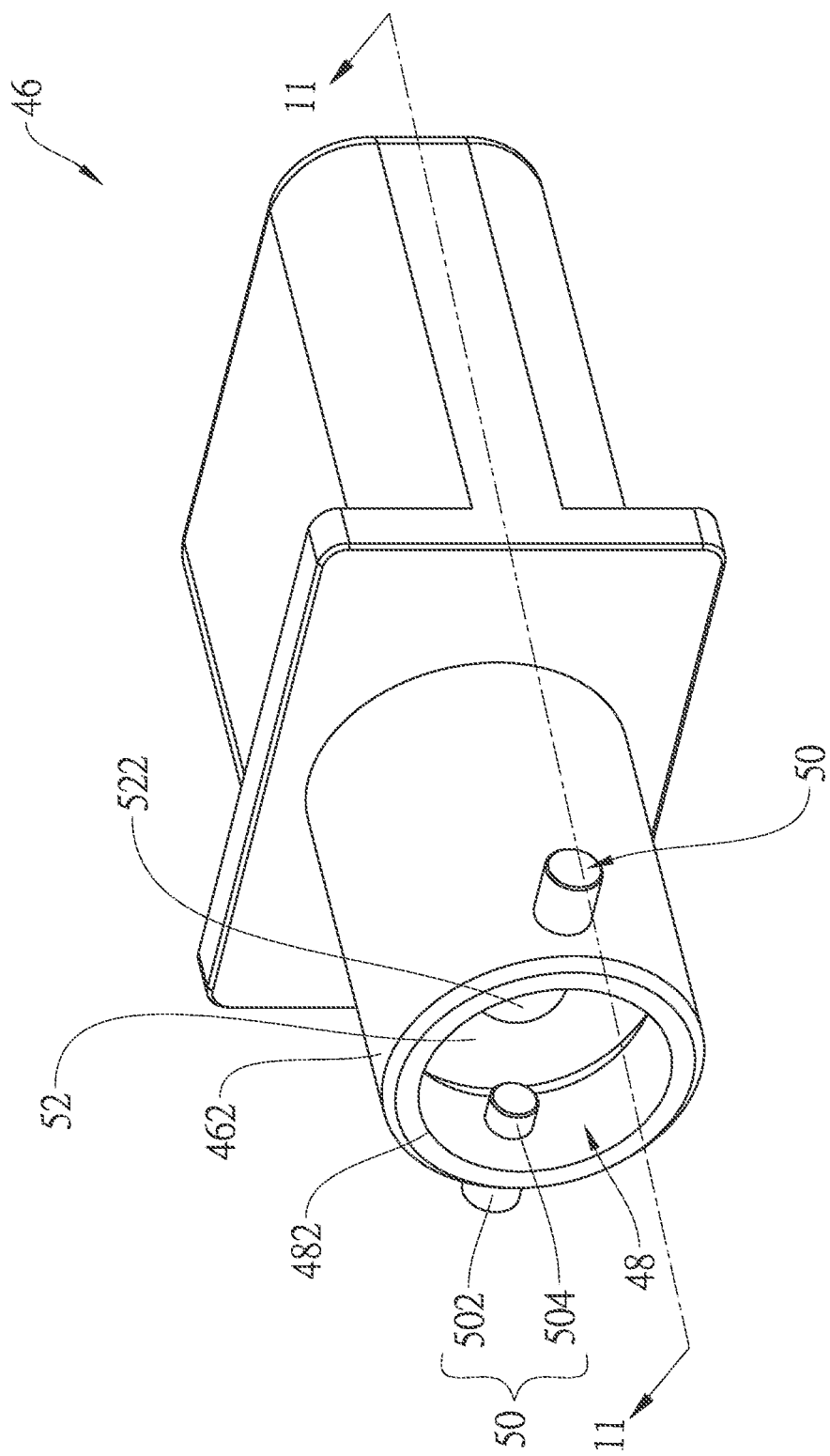
FIG. 10 is a perspective view of the manipulating member according to the embodiment of the present invention.
Figure 11:
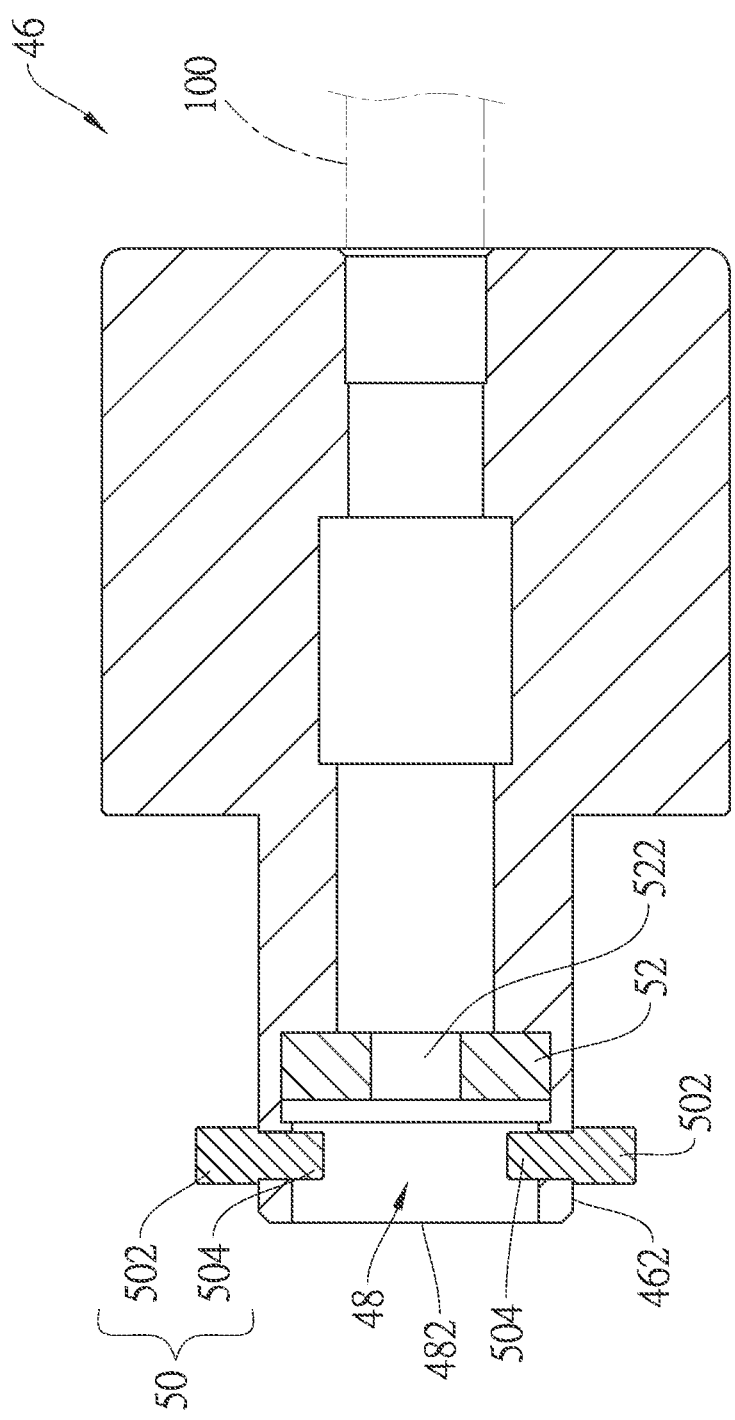
FIG. 11 is a sectional view along the 11-11 line in FIG. 10.

Referring to FIG. 8 and FIG. 9, the outlet portion 14 has a receiving hole 16, wherein the receiving hole 16 has a first section 18, a second section 20, and a third section 22 connected in sequence along an axial direction thereof. The outlet port 142 is located at the first section 18. The first section 18 has a connecting passage 182. The second section 20 is located between the first section 18 and the third section 22 and forms a receiving chamber, wherein a hole wall of the second section 20 is tapered in shape. More specifically, a diameter of the second section 20 gradually decreases in a direction from the first section 18 to the third section 22. The hole wall of the second section 20 (i.e., a wall of the receiving chamber) has a side opening 202 communicating with the inlet passage 124. A junction between the third section 22 and the second section 20 has a shoulder portion 222. An inner wall of the connecting passage 182 (i.e., a hole wall of the first section 18) has an annular groove 182a. An end portion of the outlet port 142 has at least one recess 142a. In the current embodiment, a number of the at least one recess 142a is two, and the two recesses 142a communicate with the annular groove 182a. The annular groove 182a has a groove wall 182b facing the second section 20.

Figure 6:
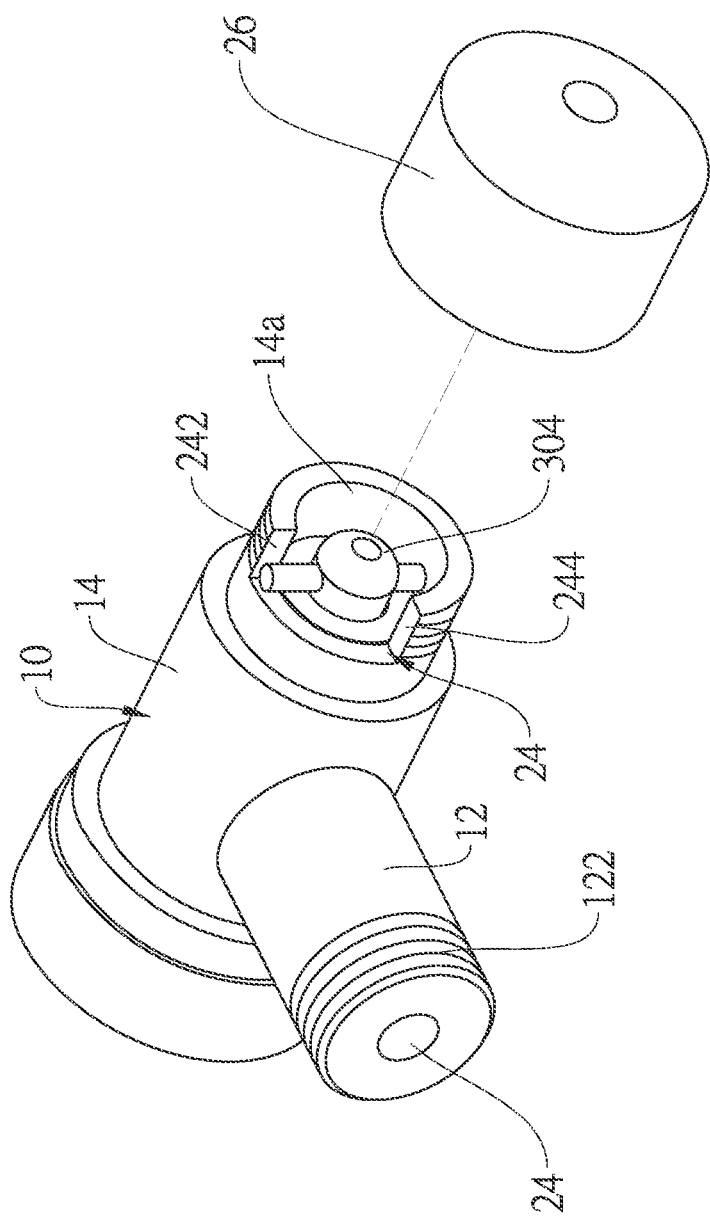
FIG. 6 is an exploded perspective of the valve body and the switching assembly according to the embodiment of the present invention.
Figure 7:
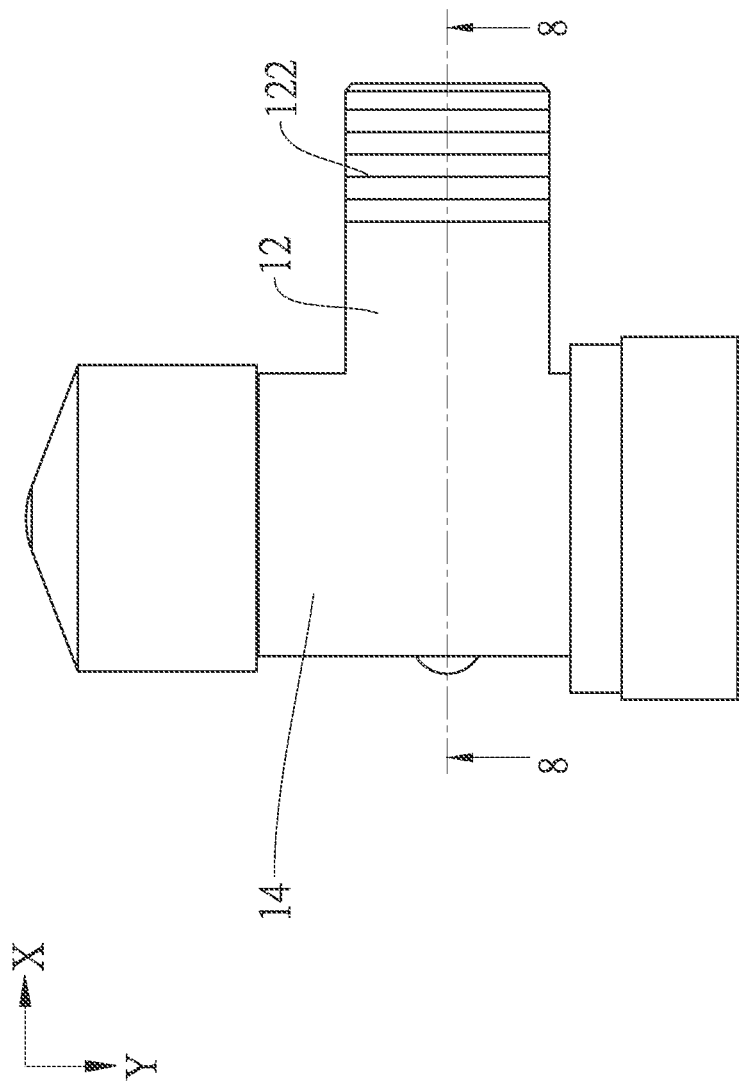
FIG. 7 is a top view of the valve body according to the embodiment of the present invention.

Additionally, the outlet portion 14 has a restricting groove 24 located at a radial periphery of the third section 22 and communicating with the third section 22. Two end walls of the restricting groove 24 respectively form a first blocking portion 242 and a second blocking portion 244 (as shown in FIG. 6). In the current embodiment, the outlet portion 14 has an open end 14a at an outer side of the third section 22, and a rear cover 26 is engaged around a radial periphery of the third section 22 in a threaded way to close the open end 14a.

The switching assembly 28 includes a plug member 30, wherein the plug member 30 has a first end 302 and a second end 304 opposite to the first end 302 in an axial direction thereof. At least a part of the plug member 30 is located in the second section 20 of the receiving hole 16. The plug member 30 has an axial hole 32 and a through hole 34 located in a radial direction of the plug member 30, wherein the axial hole 32 communicates with the through hole 34 and the outlet port 142. More specifically, the plug member 30 includes a driving section 36, a tapered section 38, and an extending section 40, wherein the driving section 36 has the first end 302, and the tapered section 38 is located between the driving section 36 and the extending section 40, and the driving section 36 is located at the first section 18. The tapered section 38 is located at the second section 20, wherein an outer peripheral surface of the tapered section 38 matches with the hole wall of the second section 20. The extending section 40 is located at the third section 22 and has the second end 304.

The axial hole 32 has an open side 322 and a close side 324, wherein the open side 322 is formed at the first end 302, and the close side 324 is located at the tapered section 38 and is located between the first end 302 and the second end 304. The through hole 34 is located on the tapered section 38.

The first end 302 has at least one notch 302a. In the current embodiment, referring to FIGS. 4-5, a number of the at least one notch 302a is two, wherein the two notches 302a are located at two opposite sides of a radial periphery of the axial hole 32. The annular groove 182a of the outlet port 142 surrounds a radial periphery of the two notches 302a.

The switching assembly 28 further includes an elastic member 42, wherein an end of the elastic member 42 abuts against the shoulder portion 222, while another end of the elastic member 42 exerts a force on the extending section 40 in a direction away from the shoulder portion 222, so that the outer peripheral surface of the tapered section 38 could tightly abut against the hole wall of the second section 20. In the current embodiment, the switching assembly 28 includes a blocking member which is a blocking rod 44 as an example, wherein the blocking rod 44 is disposed at the extending section 40 of the plug member 30 and extends in a radial periphery of the extending section 40. Another end of the elastic member 42 abuts against the blocking rod 44. The elastic member 42 includes a spring 424 and two blocking plates 422 fitting around the extending section 40, wherein the spring 424 is located between the two blocking plates 422. One of the blocking plates 422 forms an end of the elastic member 42 and abuts against the shoulder portion 222, while the other blocking plate 422 forms another end of the elastic member 42 and abuts against the blocking rod 44. An end of the blocking rod 44 extends into the restricting groove 24 and is located between the first blocking portion 242 and the second blocking portion 244 for restricting a rotation angle of the plug member 30.

Figure 5:
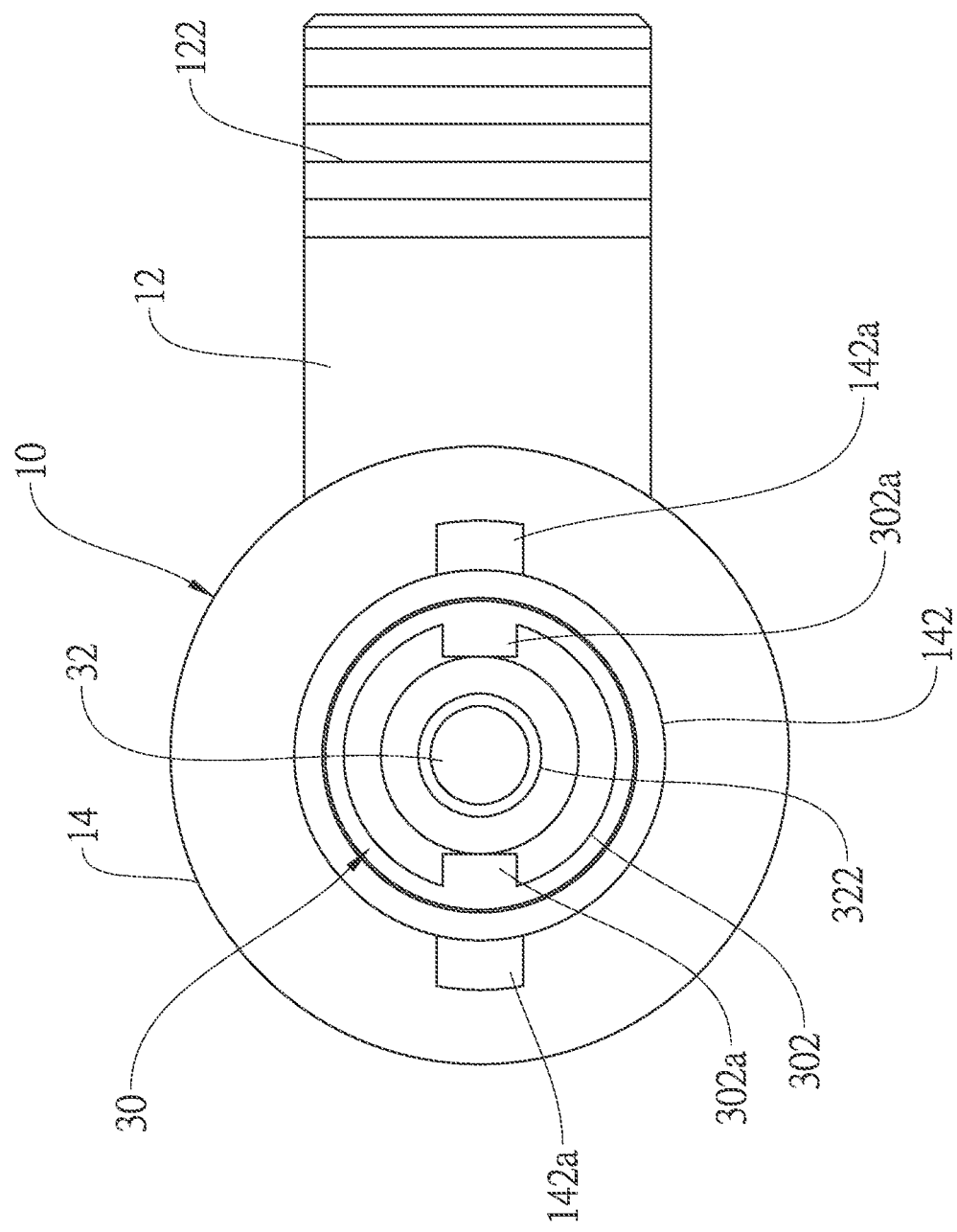
FIG. 5 is a front view of the valve body and the switching assembly according to the embodiment of the present invention.
Figure 12:
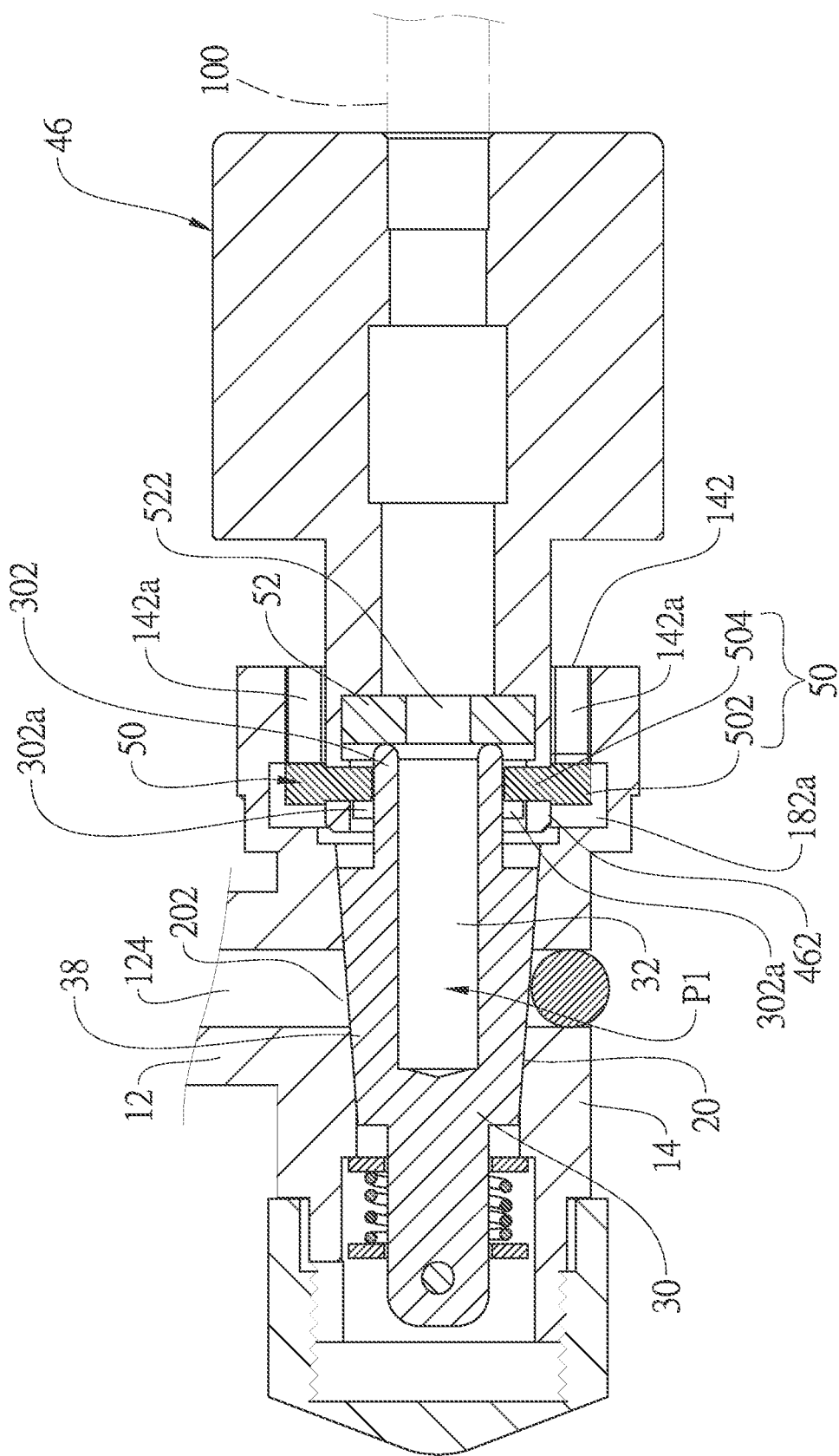
FIG. 12 is a sectional view along the 12-12 line in FIG. 1.
Figure 13:
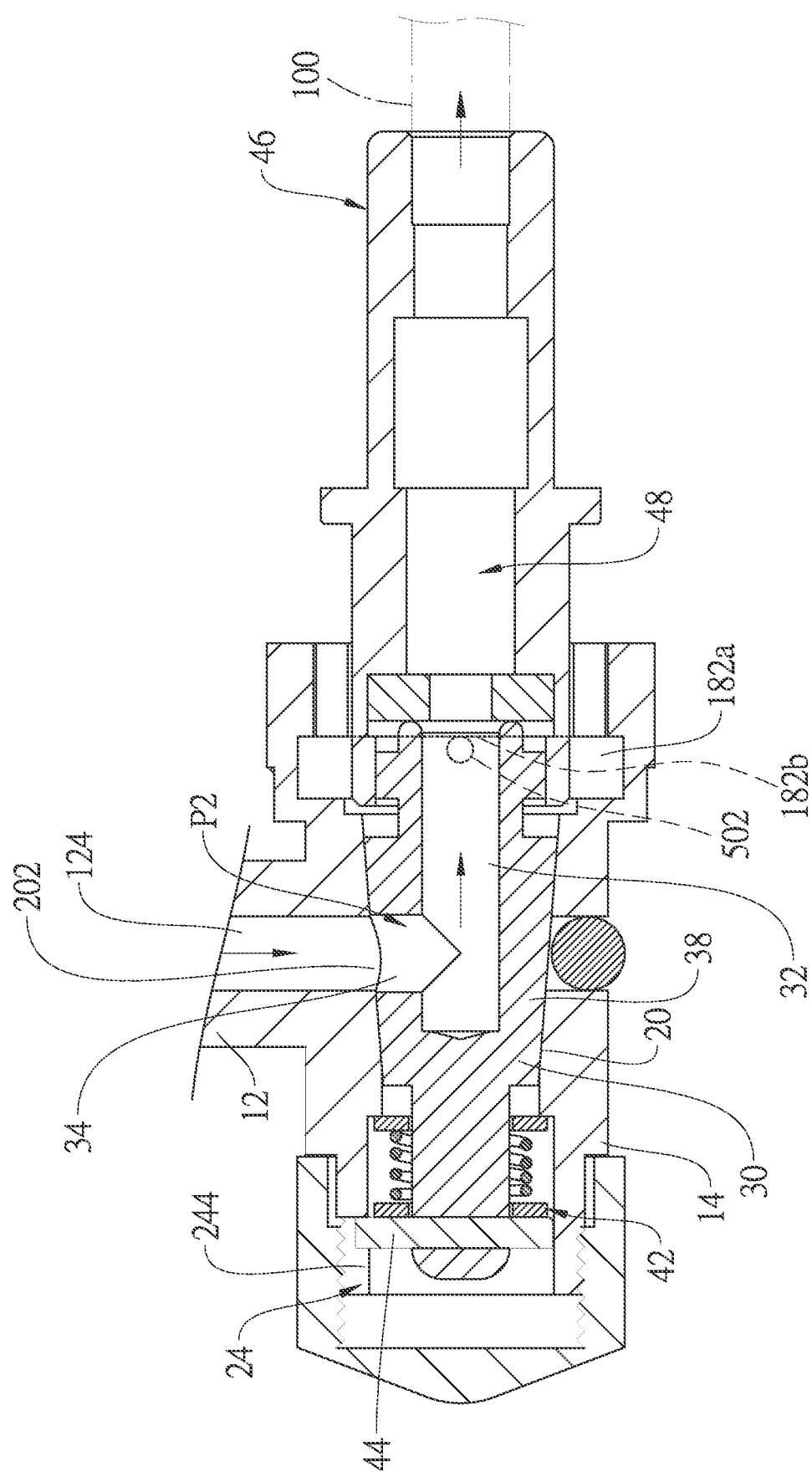
FIG. 13 is a schematic view, showing the manipulating member drives the plug member to open the side opening.

Referring to FIG. 8, FIG. 12, and FIG. 13, the plug member 30 is manipulable to turn in the axial direction of the plug member 30 between a first position P1 and a second position P2. Referring to FIG. 12, when the plug member 44 is at the first position P1, the outer peripheral surface of the tapered section 38 of the plug member 30 closes the side opening 202 to block the output gas, and the notches 302a on the first end 302 of the plug member 30 and the recess 142a of the outlet port 142 are located at the same reference plane (as shown in FIG. 5), and the blocking rod 44 abuts against the first blocking portion 242. Referring to FIG. 13, when the plug member 30 is at the second position P2, the blocking rod 44 abuts against the second blocking portion 244, and the through hole 34 communicates with the side opening 202 to open the output gas, allowing the output gas being outputted through the outlet port 142.

The manipulating member 46 has a connecting end 462 and has a gas passage 48 therein. An end of the gas passage 48 forms an inlet 482 at the connecting end 462, while another end of the gas passage 48 is adapted to communicate with a gas pipe 100, wherein the gas pipe 100 could be a hose and be connected to a gas apparatus. The manipulating member 46 is detachably connected to the outlet port 142 via the connecting end 462, and the connecting end 462 is connected to the plug member 30, and the gas passage 48 communicates with the axial hole 32. The manipulating member 46 drives the plug member 30 to turn between the first position P1 and the second position P2.

More specifically, referring to FIG. 10 to FIG. 13, the connecting end 462 of the manipulating member 46 is configured with at least one positioning member 50. In the current embodiment, a number of the at least one positioning member 50 is two. When the plug member 30 is located at the first position P1, each of the positioning members 50 could enter the annular groove 182a via one of the recesses 142a of the outlet port 142, and could further enter one of the notches 302a of the plug member 30.

In the current embodiment, the positioning members 50 are disposed in a radial direction of the connecting end 462, wherein each of the positioning members 50 has an outer end 502 protruding out of a radial periphery of the connecting end 462 and an inner end 504 located in the gas passage 48. A sealing member 52 is disposed in the gas passage 48 and has a through hole 522 communicating with the gas passage 48.

When the plug member 30 is located at the first position P1 and the connecting end 462 is connected to the plug member 30, the outer end 502 of each of the positioning members 50 enters the annular groove 182a via one of the recesses 142a, and the inner end 504 of each of the positioning members 50 enters one of the notches 302a. The first end 302 of the plug member 30 is located in the gas passage 48 and abuts against the sealing member 52. The open side 322 of the axial hole 32 communicates with the through hole 522 and the gas passage 48. When the user turns the manipulating member 46, the inner end 504 of each of the positioning members 50 abuts against a wall of each of the notches 302a to drive the plug member 30 to turn to the second position P2 in the axial direction thereof. During the turn, when the outer end 502 of each positioning member 50 leaves a projection range of one of the recesses 142a, the groove wall 182b of the annular groove 182a restricts the outer end 502 of each positioning member 50 to the annular groove 182a (as shown at the dotted line in FIG. 12). In this way, when the plug member 30 turns from the first position P1 to the second position P2, the annular groove 182a restricts the manipulating member 46 from disengaging, and the first end 302 of the plug member 30 stably abuts against the sealing member 52, thereby the output gas outputted from the axial hole 32 of the plug member 30 could enter the gas passage 48 of the manipulating member 46 to be transmitted to the gas pipe 100.

When the user does not use gas, the manipulating member 46 could be turned in a reverse direction, and the plug member 30 could be turned back to the first position P1, so that the plug member 30 could block the gas, and the manipulating member 46 could be removed from the outlet port 142 of the valve body 10.

With the aforementioned design, it is more convenient to use the output gas by using the manipulating member 46 to turn the plug member 30 to allow the output gas to be transmitted to the gas pipe 100 via the gas passage 48 in the manipulating member 46. After use, the manipulating member 46 could be removed together with the gas pipe 100. Additionally, since the plug member 30 is in the valve body 10, the plug member 30 would not be touched by mistake to lead to a problem that the output gas leaks from the outlet port 142, which enhances a safety of use.

It must be pointed out that the embodiments described above are only some preferred embodiments of the present invention. All equivalent structures which employ the concepts disclosed in this specification and the appended claims should fall within the scope of the present invention.

What is claimed is:

1. A gas switching device, comprising:
   a valve body having an inlet portion and an outlet portion, wherein the inlet portion has an inlet passage for injecting gas; the outlet portion has an outlet port and a receiving chamber; a wall of the receiving chamber has a side opening communicating with the inlet passage;
   a switching assembly comprising a plug member located in the receiving chamber, wherein the plug member has a through hole located at a radial direction of the plug member and an axial hole communicating with the through hole and the outlet port; the plug member is turnable between a first position and a second position in an axial direction of the plug member; when the plug member is at the first position, an outer peripheral surface of the plug member closes the side opening; when the plug member is at the second position, the through hole communicates with the side opening; and
   a manipulating member having a connecting end and has a gas passage therein, wherein an end of the gas passage forms an inlet at the connecting end, and another end of the gas passage is adapted to communicate with a gas pipe; the manipulating member is detachably connected to the outlet port via the connecting end; the connecting end is connected to the plug member, and the gas passage communicates with the axial hole; the manipulating member drives the plug member to turn between the first position and the second position;
   wherein at least one positioning member is disposed on the connecting end of the manipulating member; the outlet port of the valve body has a connecting passage; an inner wall of the connecting passage has an annular groove; an end portion of the outlet port has at least one recess communicating with the annular groove; the at least one positioning member enters the annular groove via the at least one recess;
   wherein the plug member has a first end and a second end opposite to the first end in an axial direction of the plug member; the axial hole has an open side formed at the first end and a close side located between the first end and the second end; the first end has at least one notch; the annular groove surrounds a radial periphery of the at least one notch; when the plug member is located at the first position, the at least one positioning member enters the at least one notch via the at least one recess and is adapted to drive the plug member to turn to the second position along the axial direction of the plug member.

2. The gas switching device as claimed in claim 1, wherein the at least one positioning member is arranged in a radial direction of the connecting end and has an outer end protruding out of a radial periphery of the connecting end and an inner end located in the gas passage; when the connecting end is connected to the plug member, the first end of the plug member is located in the gas passage, and the inner end of the at least one positioning member enters the at least one notch, and the outer end of the at least one positioning member enters the annular groove.

3. The gas switching device as claimed in claim 2, wherein a sealing member is disposed in the gas passage and has a through hole communicating with the gas passage; when the connecting end is connected to the plug member, the first end of the plug member abuts against the sealing member, and the open side of the axial hole communicates with the through hole.

4. The gas switching device as claimed in claim 1, wherein when the at least one positioning member drives the plug member to turn to the second position along the axial direction of the plug member, a groove wall of the annular groove restricts the at least one positioning member in the annular groove.

5. The gas switching device as claimed in claim 1, wherein the outlet portion has a receiving hole; the receiving hole has a first section, a second section, and a third section; the first section has the connecting passage; the second section is located between the first section and the third section; a hole wall of the second section is tapered in shape and forms the receiving chamber, and a diameter of the second section gradually decreases in a direction from the first section to the third section; a junction between the third section and the second section has a shoulder portion; the plug member comprises a tapered section and an extending section; an outer peripheral surface of the tapered section matches with the hole wall of the second section; the through hole is located on the tapered section; the extending section is connected to the tapered section and is located at the third section of the receiving hole; the switching assembly comprises an elastic member; an end of the elastic member abuts against the shoulder portion, while another end of the elastic member exerts a force on the extending section in a direction way from the shoulder portion, so that the outer peripheral surface of the tapered section abuts against the hole wall of the second section.

6. The gas switching device as claimed in claim 5, wherein the switching assembly comprises a blocking member disposed at the extending section of the plug member; the another end of the elastic member abuts against the blocking member.

7. The gas switching device as claimed in claim 6, wherein the elastic member comprises two blocking plates and a spring; the two blocking plates fits around the extending section, and one of the blocking plates abuts against the shoulder portion, while the other blocking plate abuts against the blocking member; the spring fits around the extending section and is located between the two blocking plates.

8. The gas switching device as claimed in claim 6, wherein the outlet portion of the valve body has a restricting groove communicating with the third section of the receiving hole; the restricting groove has a first blocking portion and a second blocking portion; the blocking member enters the restricting groove; when the plug member is turned to the first position, the blocking member abuts against the first blocking portion; when the plug member is turned to the second position, the blocking member abuts against the second blocking portion.

9. A gas switching device, comprising:
  a valve body having an inlet portion and an outlet portion, wherein the inlet portion has an inlet passage for injecting gas; the outlet portion has an outlet port and a receiving chamber; a wall of the receiving chamber has a side opening communicating with the inlet passage;
  a switching assembly comprising a plug member located in the receiving chamber, wherein the plug member has a through hole located at a radial direction of the plug member and an axial hole communicating with the through hole and the outlet port; the plug member is turnable between a first position and a second position in an axial direction of the plug member; when the plug member is at the first position, an outer peripheral surface of the plug member closes the side opening; when the plug member is at the second position, the through hole communicates with the side opening; and
  a manipulating member having a connecting end and has a gas passage therein, wherein an end of the gas passage forms an inlet at the connecting end, and another end of the gas passage is adapted to communicate with a gas pipe; the manipulating member is detachably connected to the outlet port via the connecting end; the connecting end is connected to the plug member, and the gas passage communicates with the axial hole; the manipulating member drives the plug member to turn between the first position and the second position;
  wherein at least one positioning member is disposed on the connecting end of the manipulating member; the outlet port of the valve body has a connecting passage; an inner wall of the connecting passage has an annular groove; an end portion of the outlet port has at least one recess communicating with the annular groove; the at least one positioning member enters the annular groove via the at least one recess;
  wherein the outlet portion has a receiving hole; the receiving hole has a first section, a second section, and a third section; the first section has the connecting passage; the second section is located between the first section and the third section; a hole wall of the second section is tapered in shape and forms the receiving chamber, and a diameter of the second section gradually decreases in a direction from the first section to the third section; a junction between the third section and the second section has a shoulder portion; the plug member comprises a tapered section and an extending section; an outer peripheral surface of the tapered section matches with the hole wall of the second section; the through hole is located on the tapered section; the extending section is connected to the tapered section and is located at the third section of the receiving hole; the switching assembly comprises an elastic member; an end of the elastic member abuts against the shoulder portion, while another end of the elastic member exerts a force on the extending section in a direction way from the shoulder portion, so that the outer peripheral surface of the tapered section abuts against the hole wall of the second section.

10. The gas switching device as claimed in claim 9, wherein the switching assembly comprises a blocking member disposed at the extending section of the plug member; the another end of the elastic member abuts against the blocking member.

11. The gas switching device as claimed in claim 10, wherein the elastic member comprises two blocking plates and a spring; the two blocking plates fits around the extending section, and one of the blocking plates abuts against the shoulder portion, while the other blocking plate abuts against the blocking member; the spring fits around the extending section and is located between the two blocking plates.

12. The gas switching device as claimed in claim 10, wherein the outlet portion of the valve body has a restricting groove communicating with the third section of the receiving hole; the restricting groove has a first blocking portion and a second blocking portion; the blocking member enters the restricting groove; when the plug member is turned to the first position, the blocking member abuts against the first blocking portion; when the plug member is turned to the second position, the blocking member abuts against the second blocking portion.

* * * * *